United States Patent
Kim et al.

(10) Patent No.: US 12,375,183 B2
(45) Date of Patent: Jul. 29, 2025

(54) BEAM TRACKING MODULE, FREE-SPACE QUANTUM COMMUNICATION DEVICE, AND FREE-SPACE OPTICAL COMMUNICATION DEVICE

(71) Applicant: Electronics and Telecommunications Research Institute, Daejeon (KR)

(72) Inventors: Minchul Kim, Daejeon (KR); Chun Ju Youn, Daejeon (KR); Kap-Joong Kim, Daejeon (KR); Kyoungchun Lim, Daejeon (KR); Byung Seok Choi, Daejeon (KR); Joong-Seon Choe, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 277 days.

(21) Appl. No.: 18/312,995

(22) Filed: May 5, 2023

(65) Prior Publication Data

US 2023/0361884 A1    Nov. 9, 2023

(30) Foreign Application Priority Data

May 6, 2022    (KR) .......................... 10-2022-0056198

(51) Int. Cl.
*H04B 10/00* (2013.01)
*H04B 10/11* (2013.01)
*H04B 10/70* (2013.01)

(52) U.S. Cl.
CPC ............. *H04B 10/70* (2013.01); *H04B 10/11* (2013.01)

(58) Field of Classification Search
CPC ... H04B 10/11; H04B 10/112; H04B 10/1123; H04B 10/1125; H04B 10/1127;
(Continued)

(56) References Cited

U.S. PATENT DOCUMENTS

| 8,315,526 B2 | 11/2012 | Tan et al. |
| 8,477,939 B2 | 7/2013 | Youn et al. |

(Continued)

FOREIGN PATENT DOCUMENTS

| KR | 10-1516332 | 5/2015 |
| KR | 10-2041194 | 11/2019 |

OTHER PUBLICATIONS

Liao et al., "Long-distance free-space quantum key distribution in daylight towards inter-satellite communication", nature photonics, Jul. 24, 2017, pp. 509-514, vol. 11.
(Continued)

*Primary Examiner* — Hanh Phan
(74) *Attorney, Agent, or Firm* — KILE PARK REED & HOUTTEMAN PLLC (57) ABSTRACT

Provided are a beam tracking module, a free-space quantum communication device, and a free-space optical communication device. The beam tracking module for free-space quantum communication includes a controller configured to determine a divergence angle of a reference beam on the basis of divergence angle control data, a beam path control optical part configured to output the reference beam, and a beam transmitter configured to adjust the divergence angle through the beam path control optical part so that the reference beam having the determined divergence angle is output.

20 Claims, 5 Drawing Sheets

(58) Field of Classification Search
CPC . H04B 10/1129; H04B 10/118; H04B 10/114;
H04B 10/1143; H04B 10/1149; H04B
10/0795; H04B 10/70; H04B 10/40;
H04B 10/116; H04L 9/0858; H04L
9/0869
USPC ....... 398/118, 119, 120, 121, 122, 123, 124,
398/125, 126, 127, 128, 129, 130, 131,
398/115, 33, 38, 141, 135, 136, 158, 159,
398/172, 137; 380/255, 256, 278, 277,
380/44
See application file for complete search history.

(56) References Cited

U.S. PATENT DOCUMENTS

| | | |
|---|---|---|
| 8,774,638 B2 | 7/2014 | Duligall et al. |
| 11,159,235 B1* | 10/2021 | Nykolak ............ H04B 10/1143 |
| 2021/0306077 A1 | 9/2021 | Lim et al. |
| 2023/0254135 A1* | 8/2023 | Lyons .................. H04B 10/118 |
| | | 380/256 |

OTHER PUBLICATIONS

Vuong V. Mai et al, 'Adaptive beam control techniques for airborne free-space optical communication systems', Appl. Opt., vol. 57, No. 26, pp. 7462-7471 (Sep. 10, 2018).
Matthias Goy et al, 'High Performance Optical Free-Space Links for Quantum Communications', International Conference on Space Optics—ICSO 2020 (Mar. 30-Apr. 2, 2021).

* cited by examiner

BEAM TRACKING MODULE, FREE-SPACE QUANTUM COMMUNICATION DEVICE, AND FREE-SPACE OPTICAL COMMUNICATION DEVICE

CROSS-REFERENCE TO RELATED APPLICATION

This application claims priority to and the benefit of Korean Patent Application No. 10-2022-0056198, filed on May 6, 2022, the disclosure of which is incorporated herein by reference in its entirety.

BACKGROUND

1. Field of the Invention

The present disclosure relates to a beam tracking module, device, and method for free-space quantum communication, and more particularly, to a beam tracking module, device, and method for free-space quantum communication with which a beam divergence angle may be adjusted so that beam tracking is implemented universally in various situations, for example, various distance ranges.

2. Discussion of Related Art

According to free-space quantum communication, communication can be performed by transmitting and receiving optical signals in a quantum state in free space. A beam tracking system (also called pointing, acquisition and tracking (PAT) system) may be used for accurately transmitting an optical signal from a transmitting device which performs communication to a receiving device and also keeping an optical path constant from vibrations in a system including the devices or a free space channel. In addition to a quantum optical signal, an additional reference beam may be used for aligning and stabilizing the optical path.

Beam tracking may be a function of forming and stabilizing an accurate optical path in free space. Beam tracking is required in free-space quantum communication systems that transmit and receive optical signals in a quantum state in free space.

Reference beams may be emitted from beam tracking modules on both transmitting and receiving devices of a quantum communication system (e.g., a quantum communication system or a quantum key distribution system) to their counterpart devices. Each of the beam tracking modules may track a position of a beam emitted from its counterpart device and transmit a beam in the corresponding direction.

As other tracking methods, there are a method of tracking a reference beam which is emitted by a device and reflected by a counterpart device and a method of receiving position data of a reference beam detected by a counterpart device through radio frequency (RF) communication and the like and correcting a beam emission direction of a device. However, the former reflection method has a limitation in that the loss of a reference beam increases, and the latter method of receiving a position detected by a counterpart device has a performance limitation due to communication delay. Therefore, quantum communication systems mainly use a method of tracking reference beams emitted by both devices.

Beam tracking modules which emit reference beams in both devices according to the related art are managed at a fixed distance between the transmission and receiving devices or in a quantum communication environment in which a fixed beam divergence angle is naturally increased, for example, in a long-range communication environment corresponding to several kilometers or more. In other words, a reference beam is output at a fixed divergence angle by the beam tracking modules according to the related art. Communication systems having modules according to the related art have limitations in that they operate only for a long range corresponding to a specific distance or more and cannot be universally used for various distances from short range to middle range.

Further, the position of a reference beam detected by a receiving device may continuously fluctuate due to errors caused by inherent limitations of a transmitting device or the receiving device, vibrations of the device, noise of electronic components of the device, etc. during a beam tracking process. When fluctuation is originated from optics of a system that detects the beam, a free space channel, etc., an optical path actually requires correction, and it is necessary to perform beam tracking accordingly. In particular, such fluctuations may be originated from an error of a beam emission angle caused by noise of a driving module of a device which emits a beam. In this case, even when the angular error is small, the beam position error may be increased due to the distance between the transmitting device and the receiving device.

Here, when the position error caused by beam fluctuations exceeds an allowable range in which the beam tracking system can receive light, no beam is received, and thus beam tracking may be stopped.

Although the beam position error is within the light-receiving allowable range, when the tracking module receiving the beam may control the corresponding device to correct the position error, a beam output by the corresponding device is actually emitted in a direction in which the error increases. For this reason, an error angle of the reference beam emitted by the device, from which a beam is initially output with a small error, further increases in series. As a result, the initial small error gradually increases in series, and beam tracking is stopped. Therefore, to prevent the stop of beam tracking caused by the above-described position error, it is necessary to adjust a beam divergence angle at which a position error is tolerated in beam tracking.

As a result, beam tracking is stably performed when the transmission and receiving devices change the beam divergence angle in accordance with various situations resulting from movement, for example, various distance ranges corresponding to not only a long range but also a short range and a middle range, the position error, etc. Further, when quantum communication is commercialized and used in a practical environment, a general system, which can be operated continuously with various distances corresponding to the short range to the middle range is necessary. Consequently, a beam divergence angle adjustment function is required for such system.

SUMMARY OF THE INVENTION

The present disclosure is directed to providing a beam tracking module, device, and method for free-space quantum communication with which a beam divergence angle may be adjusted so that beam tracking is implemented universally in various situations, for example, various distance ranges.

Technical objectives to be achieved in the present disclosure are not limited to that described above, and other technical objectives which have not been described will be clearly understood by those of ordinary skill in the art from the following description.

According to an aspect of the present disclosure, there is provided a beam tracking module for free-space quantum communication. The beam tracking module for free-space quantum communication includes a controller configured to determine a divergence angle of a reference beam on the basis of divergence angle control data, a beam path control optical part configured to output the reference beam, and a beam transmitter configured to adjust the divergence angle through the beam path control optical part so that the reference beam having the determined divergence angle is output.

The divergence angle control data may include at least one of distance information between a transmitter-side free-space quantum communication device and a counterpart free-space quantum communication device each having the beam tracking module, or light intensity information related to a beam received from the counterpart free-space quantum communication device, or combination thereof, and the distance information may include at least one of estimated distance information inferred from reference beams exchanged between the devices, or measured distance information, or distance information based on location information of the devices, or combination thereof.

The measured distance information may be measured through laser distance measuring between the transmitter-side free-space quantum communication device and the counterpart free-space quantum communication device, and the location information may include location data and altitude data of each of the devices and may be acquired by a Global Positioning System (GPS) detector installed in each of the devices and transmitted to be shared between the devices.

When an angular error or a location error of the reference beam based on the divergence angle control data exceeds an allowable error, the controller may correct the divergence angle to increase and determine the corrected divergence angle.

The allowable error may be set in a range of the angular error or the location error in which the counterpart free-space quantum communication device receives the beam and allows tracking of the beam to be processed normally, and the angular error or the location error may be caused by fluctuations of the reference beam output from the beam path control optical part.

When situation change information is received after the reference beam having the determined divergence angle is output, the controller may readjust the divergence angle of the reference beam on the basis of the divergence angle control data and the situation change information. The situation change information may include at least one of a fluctuation state of the reference beam output from the beam path control optical part, or a change in the divergence angle control data, or a change in output control of the beam path control optical part, or a state change of a free space channel to the counterpart free-space quantum communication device which receives the reference beam, or combination thereof.

The beam path control optical part may include an optical system assembly having at least one optical component, and the optical component may include at least one of lenses, or mirrors, or beam splitters, or image capturing devices, or combination thereof. To adjust the divergence angle, the beam transmitter may control at least one of movement of the optical system assembly, or a position of the optical component, or a beam path set by the optical component, or combination thereof.

The controller may determine the divergence angle by referring to optimal beam divergence angle information for determining a correlation between the divergence angle control data and the divergence angle.

The divergence angle control data may include distance information between a transmitter-side free-space quantum communication device and a counterpart free-space quantum communication device each having the beam tracking module. The controller may output the reference beam having a certain divergence angle in accordance with the distance between the devices to the counterpart free-space quantum communication device, perform beam tracking with the counterpart free-space quantum communication device while changing the divergence angle on the basis of a valid optical alignment signal of the reference beam received from the counterpart free-space quantum communication device, and perform control such that a minimum divergence angle is determined to be a final divergence angle among changed divergence angles at which the beam tracking is processed normally. The controller may perform control such that the optimal beam divergence angle for determining the divergence angle in accordance with the distance is generated by repeatedly determining the final divergence angle while changing the distance.

When a changed divergence angle at which the beam tracking is processed normally is a set minimum value or less, the controller may perform control such that a process related to the determining of the final divergence angle in accordance with a change in the distance stops.

According to another aspect of the present disclosure, there is provided a free-space quantum communication device including a signal part configured to transmit or receive a quantum signal and a beam tracking module configured to output a reference beam for aligning a path of the quantum signal. The beam tracking module includes a controller configured to determine a divergence angle of a reference beam on the basis of divergence angle control data, a beam path control optical part configured to output the reference beam, and a beam transmitter configured to adjust the divergence angle through the beam path control optical part so that the reference beam having the determined divergence angle is output.

According to still another aspect of the present disclosure, there is provided a beam tracking method employing a beam tracking module for a free-space quantum communication, the beam tracking method including determining a divergence angle of a reference beam on the basis of divergence angle control data, adjusting, by the beam tracking module, the divergence angle, and outputting the reference beam at the adjusted divergence angle.

According to yet another aspect of the present disclosure, there is provided a free-space optical communication device including a signal part configured to transmit or receive an optical signal and a beam tracking module configured to output a reference beam for aligning a path of the optical signal. The beam tracking module includes a controller configured to determine a divergence angle of a reference beam on the basis of divergence angle control data, a beam path control optical part configured to output the reference beam, and a beam transmitter configured to adjust the divergence angle through the beam path control optical part so that the reference beam having the determined divergence angle is output.

The characteristics of the present disclosure which have been briefly summarized above are merely exemplary aspects of the detailed description of the present disclosure and do not limit the scope of the present disclosure.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, embodiments that include other components in addition to the components described in the various embodiments are also included in the scope of the present disclosure.

Hereinafter, with reference to the accompanying drawings, embodiments of the present disclosure will be described in detail so that a person skilled in the art can readily carry out the present disclosure. However, the present disclosure may be embodied in many different forms and is not limited to the embodiments described herein.

In the following description of the embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In the present disclosure, when a component is referred to as being "linked," "coupled," or "connected" to another component, it is understood that not only a direct connection relationship but also an indirect connection relationship through an intermediate component may also be included. In addition, when a component is referred to as "comprising" or "having" another component, it may mean further inclusion of another component not the exclusion thereof, unless explicitly described to the contrary.

In the present disclosure, the terms first, second, etc. are used only for the purpose of distinguishing one component from another, and do not limit the order or importance of components, etc., unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. In addition, exemplary embodiments that include other components in addition to the components described in the various embodiments are also included in the scope of the present disclosure.

Hereinafter, embodiments of the present disclosure will be described with reference to the accompanying drawings.

Figure 1:
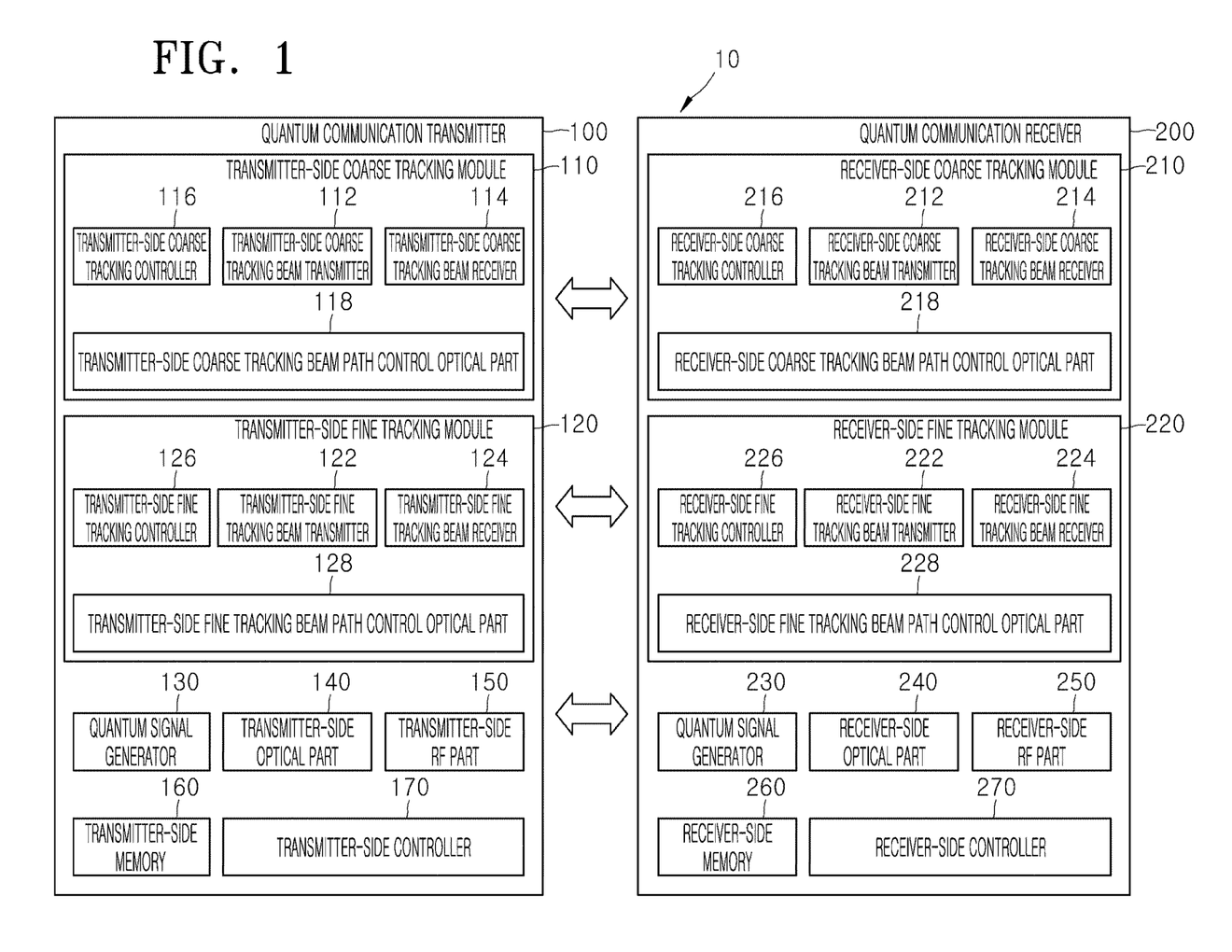
FIG. 1 is an example diagram of a free-space quantum communication system including free-space quantum communication devices according to an exemplary embodiment of the present disclosure.

FIG. 1 is an example diagram of a free-space quantum communication system including free-space quantum communication devices according to an exemplary embodiment of the present disclosure.

A free-space quantum communication system 10 may include free-space quantum communication devices that transmit and receive optical signals having quantum state information in free space, and the free-space quantum communication devices may include a transmitting device 100 and a receiving device 200. In the present disclosure, a free-space quantum communication system may be implemented as a quantum communication system capable of free-space optical communication for quantum key distribution, and may be referred to as a quantum communication system (hereinafter, "system") 10. In the case of the system 10, each of the transmitting device and the receiving device may include the quantum communication transmitting device (a free-space quantum key distribution transmitting device or a transmitter-side quantum communication device; hereinafter, "transmitting device") 100 and the quantum communication receiving device (a free-space quantum key distribution receiving device or a receiver-side quantum communication device; hereinafter, "receiving device") 200.

The transmitting device 100 may include a transmitter-side coarse tracking module 110, a transmitter-side fine tracking module 120, a quantum signal generator 130, a transmitter-side optical part 140, a transmitter-side radio frequency (RF) part 150, a transmitter-side memory 160, and a transmitter-side device controller 170.

A beam tracking operation may generally include coarse tracking and fine tracking in accordance with operation ranges, the degree of precision, and speed of the transmitting device 100 and the receiving device 200.

The transmitter-side coarse tracking module 110 may be a module that performs coarse tracking. The transmitter-side coarse tracking module 110 may include, specifically, a transmitter-side coarse tracking beam transmitter 112, a transmitter-side coarse tracking beam receiver 114, a transmitter-side coarse tracking controller 116, and a transmitter-side coarse tracking beam path control optical part 118.

The transmitter-side coarse tracking beam transmitter 112 may control the transmitter-side coarse tracking beam path control optical part 118 to output a reference beam for stably maintaining an optical path by aligning a quantum signal having information to the receiving device 200 which is a counterpart free-space quantum communication device. Specifically, the transmitter-side coarse tracking beam transmitter 112 may cause light for forming the reference beam to enter the transmitter-side coarse tracking beam path control optical part 118 and control the transmitter-side coarse tracking beam path control optical part 118 to output the reference beam at a certain divergence angle.

The transmitter-side coarse tracking beam receiver 114 may receive a reference beam output from the receiving device 200. The transmitter-side coarse tracking beam receiver 114 may include an optical system assembly having at least one optical component to track a position at which the reference beam is received and retrieve data estimated from the received reference beam. The optical component may be, for example, lenses, mirrors, or a plurality of arranged image capturing devices.

The transmitter-side coarse tracking controller 116 may determine output conditions for the reference beam, such as a divergence angle, an output direction, an output angle, etc. of the reference beam, on the basis of at least one of the data estimated from the reference beam received by the transmitter-side coarse tracking beam receiver 114, or distance information between the two devices 100 and 200, or light intensity information of the received reference beam, or combination thereof. The transmitter-side coarse tracking controller 116 may transfer the output conditions to the transmitter-side coarse tracking beam transmitter 112 and the transmitter-side coarse tracking beam path control optical part 118. Accordingly, the transmitter-side coarse tracking controller 116 may control a path and divergence angle of the reference beam.

The transmitter-side coarse tracking beam path control optical part 118 may include an optical system assembly having at least one optical component for emitting the reference beam under the output conditions. The optical component may be, for example, any of various forms of lenses and mirrors. The optical system assembly may include the illustrated optical component and an actuator for rotating or linearly moving the component as a whole. In the case of coarse tracking, the optical system assembly may be moved to suit the divergence angle by the transmitter-side coarse tracking beam transmitter 112. Specifically, coarse tracking may cause the whole optical component to rotate due to gimbal movement, pan-tilt movement, etc. through the actuator. Also, the optical system assembly including the image capturing devices of the transmitter-side coarse tracking beam receiver 114 may be moved by the transmitter-side coarse tracking controller 116 so that the position at which the reference beam is received may be adjusted. Coarse tracking may have an accuracy of tens of milliradians to tens of microradians depending on the system 10. In addition, the coarse tracking beam path control optical part 118 may control the optical system assembly in accordance with the output direction and angle received from the transmitter-side coarse tracking controller 116 to emit the reference beam.

The transmitter-side fine tracking module 120 may be a module that performs fine tracking. Specifically, the transmitter-side fine tracking module 120 may include a transmitter-side fine tracking beam transmitter 122, a transmitter-side fine tracking beam receiver 124, a transmitter-side fine tracking controller 126, and a transmitter-side fine tracking beam path control optical part 128.

The transmitter-side fine tracking beam transmitter 122 may control the transmitter-side fine tracking beam path control optical part 128 to output the reference beam to the receiving device 200 which is the counterpart free-space quantum communication device. Specifically, the transmitter-side fine tracking beam transmitter 122 may cause light for forming the reference beam to enter the transmitter-side fine tracking beam path control optical part 128 and control the transmitter-side fine tracking beam path control optical part 128 to output the reference beam at a certain divergence angle.

The transmitter-side fine tracking beam receiver 124 may receive a reference beam output from the receiving device 200. The transmitter-side fine tracking beam receiver 124 may include an optical system assembly having at least one optical component to track a position at which the reference beam is received and retrieve data estimated from the received reference beam. The optical component may be, for example, lenses, mirrors, or a plurality of arranged image capturing devices. For convenience of description, the optical components of the transmitter-side coarse tracking beam receiver 114 and the transmitter-side fine tracking beam receiver 124 are separately described, but the transmitter-side coarse tracking beam receiver 114 and the transmitter-side fine tracking beam receiver 124 may share the same optical component according to an exemplary embodiment.

The transmitter-side fine tracking controller 126 may determine output conditions for the reference beam, such as a divergence angle, an output direction, an output angle, etc. of the reference beam, on the basis of at least one of the data estimated from the reference beam received by the transmitter-side fine tracking beam receiver 124, or distance information between the two devices 100 and 200, or light intensity information of the received reference beam, or combination thereof. The transmitter-side fine tracking controller 126 may transfer the output conditions to the transmitter-side fine tracking beam transmitter 122 and the transmitter-side fine tracking beam path control optical part 128. Accordingly, the transmitter-side fine tracking controller 126 may control a path and divergence angle of the reference beam.

The transmitter-side fine tracking beam path control optical part 128 may include an optical system assembly having at least one optical component for emitting the reference beam under the output conditions. The optical component may be, for example, any of various forms of lenses and mirrors. As an example, the optical component may be a fast steering mirror, lens, etc. controlled at tens of hertz to several kilohertz. The optical system assembly may include the illustrated optical component. For convenience of description, the optical components of the transmitter-side fine tracking beam path control optical part 128 and the transmitter-side coarse tracking beam path control optical part 118 are separately described, but the transmitter-side fine tracking beam path control optical part 128 and the coarse tracking beam path control optical part 118 may share the same optical component. In addition, the optical component may be shared with the transmitter-side optical part 140 to be described below so that the reference beam and signal light may be output to the single optical component. In the case of fine tracking, the optical system assembly may precisely correct a position of a beam incident on the optical component and/or a path of the beam in the optical component to suit the divergence angle by the transmitter-side fine tracking beam transmitter 122. Also, the transmitter-side fine tracking beam receiver 124 may include, for example, a quad detector or a high-speed camera to accurately retrieve an accurate position at which the reference beam is detected, the divergence angle, etc. and precisely adjust the receiving position. Fine tracking may have an accuracy of tens of microradians to hundreds of microradians depending on the system 10. In addition, the transmitter-side fine tracking beam path control optical part 128 may control the optical component in accordance with the output direction and angle received from the transmitter-side fine tracking controller 126 to emit the reference beam.

As an element of a signal part, the quantum signal generator 130 may convert information into a quantum signal using a light source and transfer the quantum signal to the transmitter-side optical part 140.

The transmitter-side optical part 140 may include an optical system assembly having at least one optical component to emit the quantum signal as an element of the signal part. Similar to the above-described example, the optical component may include at least one of various lenses, or mirrors, or image capturing devices, or the optical system assembly, or combination thereof is substantially the same as the example described above.

The transmitter-side RF part 150 may be a communication interface that transmits and receives data related to divergence angle control data to and from the receiving device or an external device. The divergence angle control data may be the distance information between the transmitting device 100 and the receiving device 200 and location data and altitude data of the two devices 100 and 200 for calculating the distance information.

The transmitter-side memory 160 may store a program for operating the transmitting device 100, data extracted from optical signals exchanged between the two devices, and optimal beam divergence angle information for determining the divergence angle in accordance with situational changes between the two devices 100 and 200.

The transmitter-side device controller 170 may process quantum communication by controlling all the above-described components of the transmitting device 100 and also control the transmitter-side coarse tracking module 110 and the transmitter-side fine tracking module 120.

Meanwhile, the receiving device 200 may include a receiver-side coarse tracking module 210, a receiver-side fine tracking module 220, a quantum signal receiver 230, a receiver-side optical part 240, a receiver-side RF part 250, a receiver-side memory 260, and a receiver-side device controller 270.

A detailed configuration and functions of the receiving device 200 are substantially the same as those of the transmitting device 100 except for the following. As an element of the signal part, the quantum signal receiver 230 may convert an optical signal received by the receiver-side optical part 240 into information. The receiver-side optical part 240 may include an optical system assembly having at least one optical component to output the optical signal. Similar to the above-described example, the optical component may include at least one of various lenses, or mirrors, or image capturing devices, or combination thereof, and the optical system assembly is substantially the same as the example described above.

Also, the receiver-side coarse tracking module 210 may be a module that performs coarse tracking. Specifically, the receiver-side coarse tracking module 210 may include a receiver-side coarse tracking beam transmitter 212, a receiver-side coarse tracking beam receiver 214, a receiver-side coarse tracking controller 216, and a receiver-side coarse tracking beam path control optical part 218. A detailed configuration and functions of the receiver-side coarse tracking module 210 are substantially the same as those of the transmitter-side coarse tracking module 110, and thus a detailed description thereof will be omitted.

The receiver-side fine tracking module 220 may be a module that performs fine tracking. Specifically, the receiver-side fine tracking module 220 may include a receiver-side fine tracking beam transmitter 222, a receiver-side fine tracking beam receiver 224, a receiver-side fine tracking controller 226, and a receiver-side fine tracking beam path control optical part 228. A detailed configuration and functions of the receiver-side fine tracking module 220 are substantially the same as those of the transmitter-side fine tracking module 120, and thus a detailed description thereof will be omitted.

Figure 2:
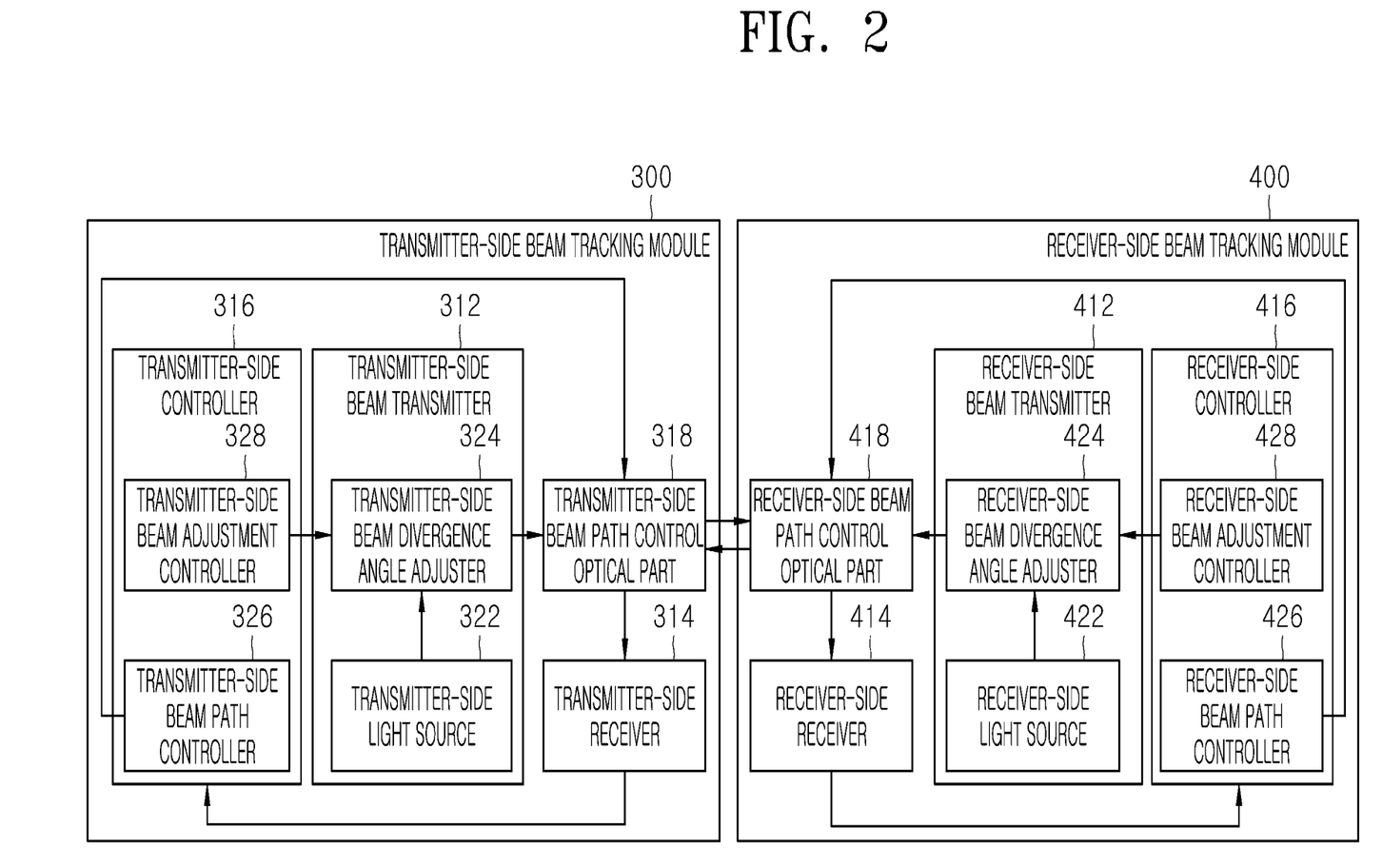
FIG. 2 is a block diagram of beam tracking modules for free-space quantum communication according to an exemplary embodiment of the present disclosure.

FIG. 2 is a block diagram of beam tracking modules for free-space quantum communication according to an exemplary embodiment of the present disclosure.

A transmitter-side beam tracking module (or a quantum key distribution transmitter-side beam tracking module; hereinafter, a "transmitter-side beam tracking module") 300 shown in FIG. 2 may be applied in common to both the transmitter-side coarse tracking module 110 and the transmitter-side fine tracking module 120 illustrated in FIG. 1. A receiver-side beam tracking module (or a quantum key distribution receiver-side beam tracking module; hereinafter, a "receiver-side beam tracking module") 400 shown in FIG. 2 may be applied in common to both the receiver-side coarse tracking module 210 and the receiver-side fine tracking module 220 illustrated in FIG. 1. In the present disclosure, for convenience of description, modules of FIG. 2 will not be separately described but will be described as transmitter-side and receiver-side beam tracking modules 300 and 400.

The transmitter-side beam tracking module 300 may include a transmitter-side beam transmitter 312, a transmitter-side beam receiver 314, a transmitter-side controller 316, and a transmitter-side beam path control optical part 318. The transmitter-side beam transmitter 312, the transmitter-side controller 316, and the transmitter-side beam path control optical part 318 may be examples of a beam transmitter, a controller, and a beam path control optical part described in the claims.

The transmitter-side beam transmitter 312 may include a transmitter-side light source 322 and a transmitter-side beam divergence angle adjuster 324. The transmitter-side controller 316 may include a transmitter-side beam path controller 326 and a transmitter-side beam adjustment controller 328.

The receiver-side beam tracking module 400 may include a receiver-side beam transmitter 412, a receiver-side beam receiver 414, a receiver-side controller 416, and a receiver-side beam path control optical part 418. The receiver-side beam transmitter 412, the receiver-side controller 416, and the receiver-side beam path control optical part 418 may be examples of a beam transmitter, a controller, and a beam path control optical part described in the claims.

The receiver-side beam transmitter 412 may include a receiver-side light source 422 and a receiver-side beam divergence angle adjuster 424. The receiver-side controller 416 may include a receiver-side beam path controller 426 and a receiver-side beam adjustment controller 428.

The foregoing components will be described below centering on a process in which the transmitter-side beam tracking module 300 outputs a reference beam to the receiver-side beam tracking module 400 and the receiver-side beam tracking module 400 performs beam tracking on the basis of the received reference beam. In reverse, the transmitter-side beam tracking module 300 may perform beam tracking. In this case, the following descriptions of the components may be reversely applied.

The transmitter-side beam divergence angle adjuster 324 may change a divergence angle of a reference beam generated at the transmitter-side light source 322 on the basis of a divergence angle transferred from the transmitter-side beam adjustment controller 328. The transmitter-side beam path control optical part 318 may emit the reference beam to the receiver-side beam tracking module 400 under control of the transmitter-side beam path controller 326.

The receiver-side receiver 414 may detect the reference beam received through the receiver-side beam path control optical part 418. The receiver-side beam path controller 426 may estimate a direction of the transmitter-side beam tracking module 300 on the basis of position information of the detected reference beam, for example, an angle of incidence, a direction of incidence, etc. of the reference beam. The receiver-side beam adjustment controller 428 may retrieve transmitter-side beam divergence angle control data and determine the divergence angle of the reference beam on the basis of the divergence angle control data. The divergence angle control data may be, for example, information on the distance to the counterpart beam tracking module, detected light intensity information, and/or the like. In this process, reference beam-related data received from the receiver-side beam path controller 426, control data of the receiver-side beam path control optical part 418, the direction of the transmitter-side beam tracking module 300, etc. may be received and used in addition to the divergence angle control data.

The receiver-side beam adjustment controller 428 may control the receiver-side beam divergence angle adjuster 424 on the basis of the divergence angle control data, and the receiver-side beam path controller 426 may operate an optical component of a receiver-side beam path control optical part 418 to adjust a direction of a reference beam to be emitted. When the divergence angle control data is retrieved, an optimal reference beam divergence angle in a corresponding environment may be set. In other words, the divergence angle control data may include at least one of distance information between the transmitting and receiving devices 100 and 200 including the beam tracking modules, or light intensity information related to a beam received from the transmitting device 100, or combination thereof. Here, the distance information may be estimated distance information which is inferred from reference beams exchanged between the devices 100 and 200. The optimal beam divergence angle in the environment may be determined on the basis of information measured in advance. In other words, the receiver-side controller 416, for example, the receiver-side beam adjustment controller 428, may determine a divergence angle with reference to optimal beam divergence angle information for determining a correlation between the divergence angle control data and the divergence angle.

Figure 3:
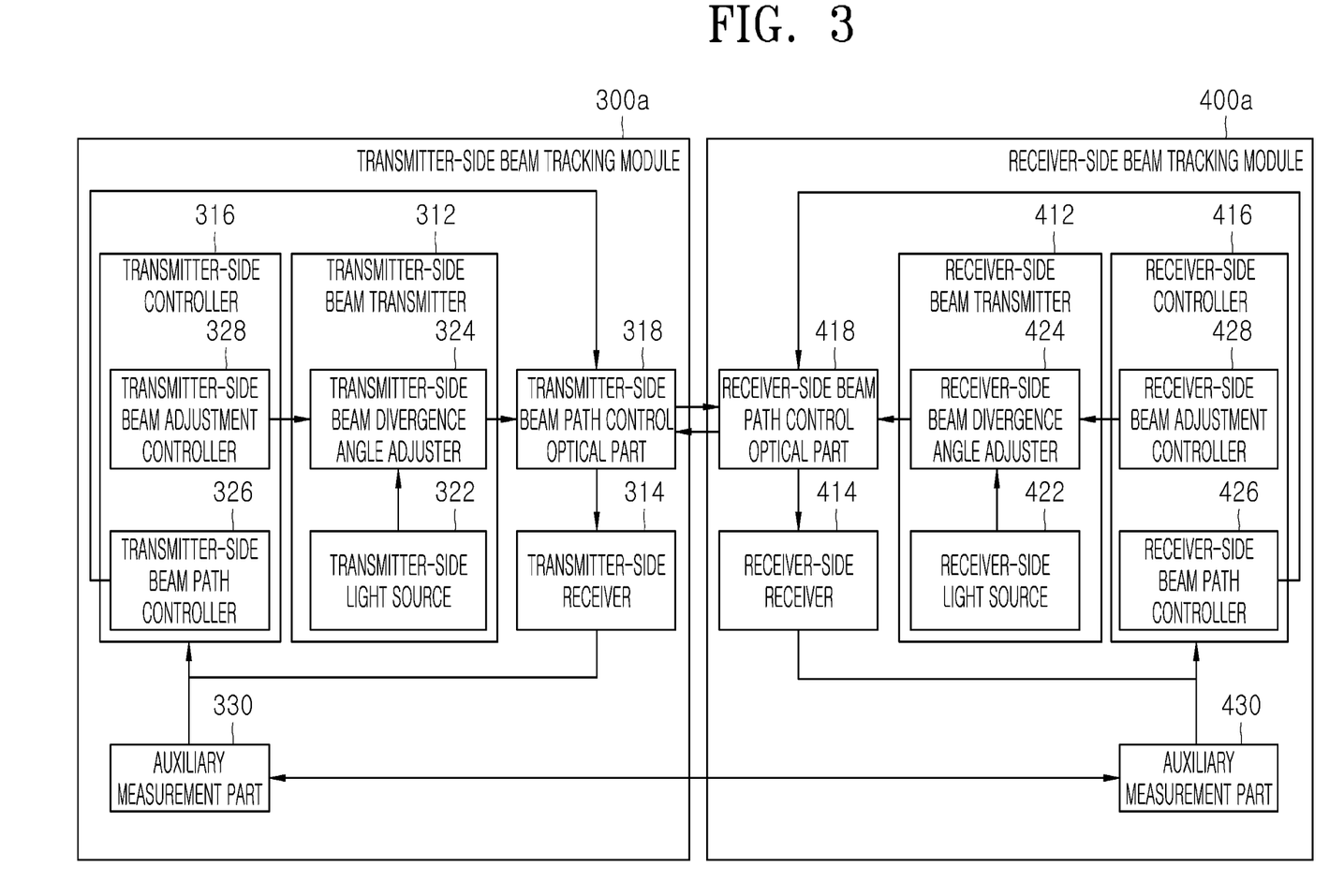
FIG. 3 is a block diagram of beam tracking modules for free-space quantum communication according to another exemplary embodiment of the present disclosure.

FIG. 3 is a block diagram of beam tracking modules for free-space quantum communication according to another exemplary embodiment of the present disclosure.

FIG. 3 shows an example in which information-collecting auxiliary measurement parts 330 and 430 for adjusting a beam divergence angle are added to the configuration of the transmitter-side and receiver-side beam tracking modules 300 and 400 shown in FIG. 2. Beam tracking modules 300a and 400a according to the other exemplary embodiments have substantially the same configuration as the beam tracking modules of FIG. 2 except for the auxiliary measurement parts 330 and 430. Accordingly, a detailed description of the same configuration as shown in FIG. 2 will be omitted, and the auxiliary measurement parts 330 and 430 will be mainly described in the present disclosure.

Both of the transmitter-side and receiver-side beam tracking modules 300a and 400a may include the auxiliary measurement parts 330 and 430 having the same function. In the present disclosure, the auxiliary measurement parts 330 and 430 will be described without distinguishing functions in the transmitter-side and receiver-side beam tracking modules 300 and 400.

The auxiliary measurement parts 330 and 430 may include all modules that collect auxiliary information required for facilitating control of a divergence angle of a reference beam and provide the auxiliary information to the transmitter-side and receiver-side controllers 316 and 416.

As described above in FIG. 2, divergence angle control data may include at least one of distance information, or light intensity information, or combination thereof. According to the exemplary embodiment of FIG. 3, the distance information may be at least one of measured distance information and distance information based on location information of the devices. The divergence angle control data may be generated to include both the distance information and light intensity information acquired as described above.

The measured distance information may be acquired through laser distance measuring between the transmitting and receiving devices 100 and 200. In this case, the auxiliary measurement parts 330 and 430 may use a laser distance measurement module. When distance information measured by the laser distance measurement module is provided to the receiver-side beam path controller 426, the receiver-side beam adjustment controller 428 may easily determine an optimal beam divergence angle on the basis of the measured distance information.

The location information for calculating distance information may include location data and altitude data of each of the devices and may be acquired by a GPS detector installed in each of the devices. The location information may be transmitted to be shared between the transmitting and receiving devices 100 and 200.

Specifically, each of the auxiliary measurement parts 330 and 430 may include a GPS module for measuring location information of the transmitting and receiving devices 100 and 200. The auxiliary measurement parts 330 and 430 may measure location and altitude data thereof using the GPS modules and then transmit location information including the data to the counterpart devices 100 and 200 using the transmitter-side and receiver-side RF parts 150 and 250. When the transmitting and receiving devices 100 and 200 share the location and altitude data with each other, the transmitter-side and receiver-side beam path controllers 326 and 426 may calculate distance information on the basis of the data. An optimal beam divergence angle may be determined on the basis of the calculated distance information. The shared GPS information, for example, the location data and the altitude data, may also be used for performing initial alignment when coarse tracking is not performed between the transmitting and receiving devices 100 and 200. Also, the RF parts 150 and 250 may be used for additional data transmission required in a quantum key distribution process. When the auxiliary measurement parts 330 and 430 measure auxiliary information, for example, measured distance information, location information, and received beam intensity, consecutively or at sufficiently short intervals, beam tracking can be continuously performed with the optimal beam divergence angle maintained regardless of rapid movement of the transmitting and receiving devices 100 and 200.

Figure 4:
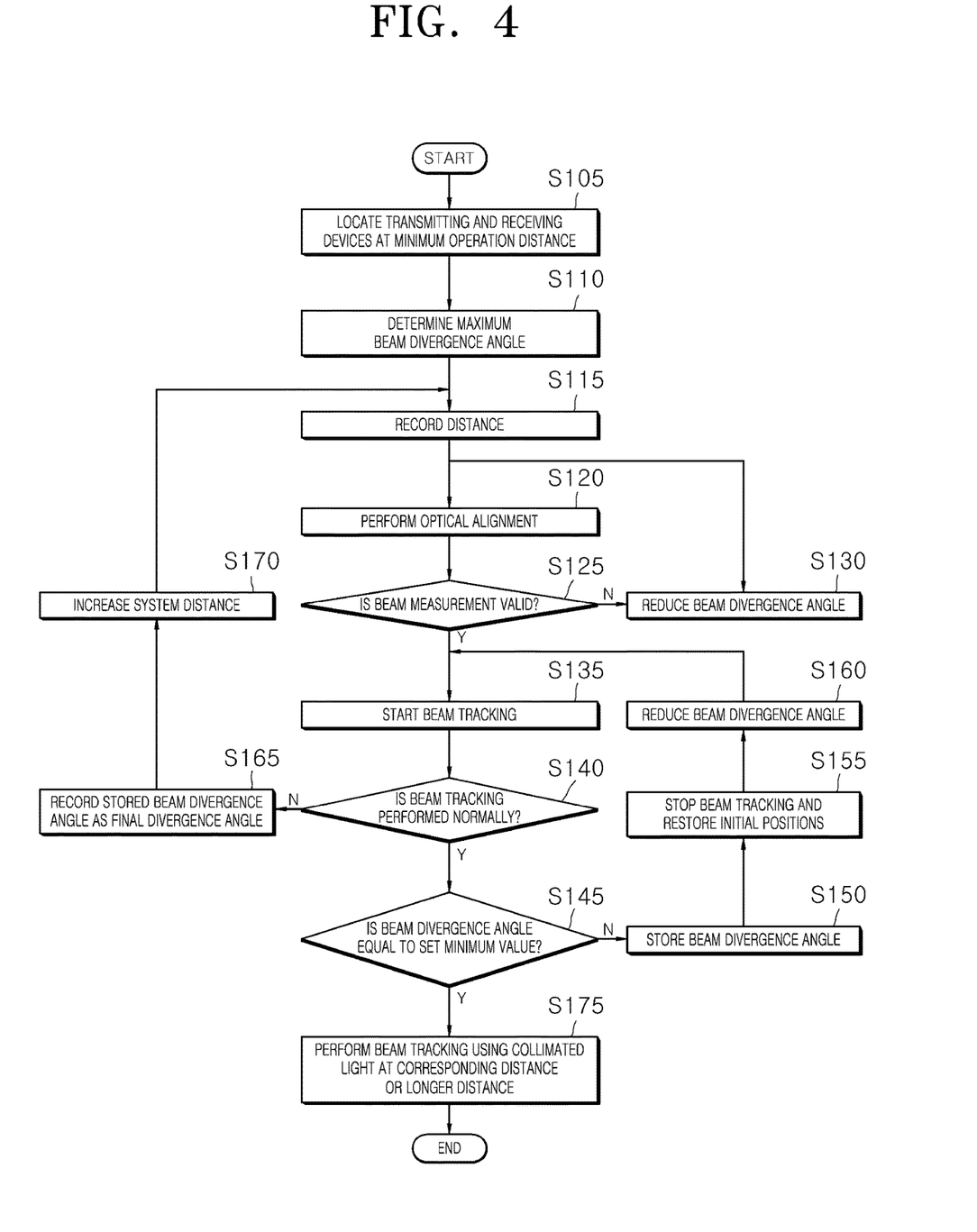
FIG. 4 is a flowchart illustrating an optimal beam divergence angle generation process used in a beam tracking method according to still another exemplary embodiment of the present disclosure.

FIG. 4 is a flowchart illustrating an optimal beam divergence angle generation process used in a beam tracking method according to still another exemplary embodiment of the present disclosure. The present disclosure illustrates the optimal beam divergence angle generation process that is performed under control of the transmitter-side and receiver-side controllers 316 and 416 of the transmitter-side and receiver-side beam tracking modules 300, 300*a*, 400, and 400*a*.

First, the transmitting and receiving devices 100 and 200 may be located at a minimum operation distance among distances at which the system will be used (S105).

Subsequently, one of the transmitting and receiving devices 100 and 200 that emits a reference beam may determine that a beam divergence angle is adjusted to be maximized (S110) and record the current distance (S115).

When the emitting device requires an optical alignment operation before beam tracking, optical alignment may be performed (S120). The device that receives the beam for alignment may determine whether a reference beam intensity is a certain value or more at the optical system of the receiving device to determine whether beam measurement is validly possible (S125).

When the reference beam intensity is less than the certain value, that is, weak, the emitting device may reduce the beam divergence angle (S130) and perform optical alignment again (S120). When the receiving device determining that beam measurement is validly possible transmits an optical alignment valid signal to the emitting device, beam tracking (or beam tracing) may be started.

When beam tracking is performed normally (Y of S140) and the beam divergence angle does not reach a set minimum value (N of S145), at least one of the emitting device, or the receiving device, or combination thereof may temporarily record and store the corresponding beam divergence angle in a buffer (S150). Then, the two devices may stop beam tracking to restore the optical component, an internal module, etc. to their initial positions (S155). Subsequently, the emitting device reduces the beam divergence angle (S160).

When beam tracking is not performed normally and the reference beam diverges (N of S140), at least one of the two devices may record a divergence angle at which beam tracking is validly measured last (e.g., a value stored in the buffer) as a final divergence angle of the corresponding distance (S165). Subsequently, operations S135 to S170 may be repeated while increasing the distance between the two devices.

When the divergence angle of the reference beam is gradually reduced to the set minimum value (Y of S145), the reference beam becomes collimated light. In this case, when beam tracking is possible and the distance between the two devices is a certain distance or longer, beam tracking may be performed using the collimated light (S175). When the divergence angle in accordance with beam tracking is recorded, a divergence angle measurement process may be finished. In brief, a device emitting a beam may perform beam tracking with a receiving device while changing a divergence angle and determine, as a final divergence angle, a minimum of changed divergence angles at which beam tracking is processed normally. The two devices may be controlled to repeatedly determine a final divergence angle while changing the distance and generate optimal beam divergence angle information for determining a divergence angle in accordance with the distance. Also, when a changed divergence angle at which beam tracking is processed normally is the set minimum value or less, the two devices may be controlled to stop the above-described process of determining a final divergence angle in accordance with a change in the distance.

With the above-described process, a minimum value of a beam divergence angle at which normal beam tracking is possible may be measured and recorded in accordance with distance. The above-described process may be similarly applied to measurement of an optimal beam divergence angle employing information other than distance information, for example, light intensity information. The measured optimal divergence angle may be used in a beam tracking process without any change, and for a further stable operation, tracking may be performed at a divergence angle changed by a specific variable from the optimal divergence angle.

Figure 5:
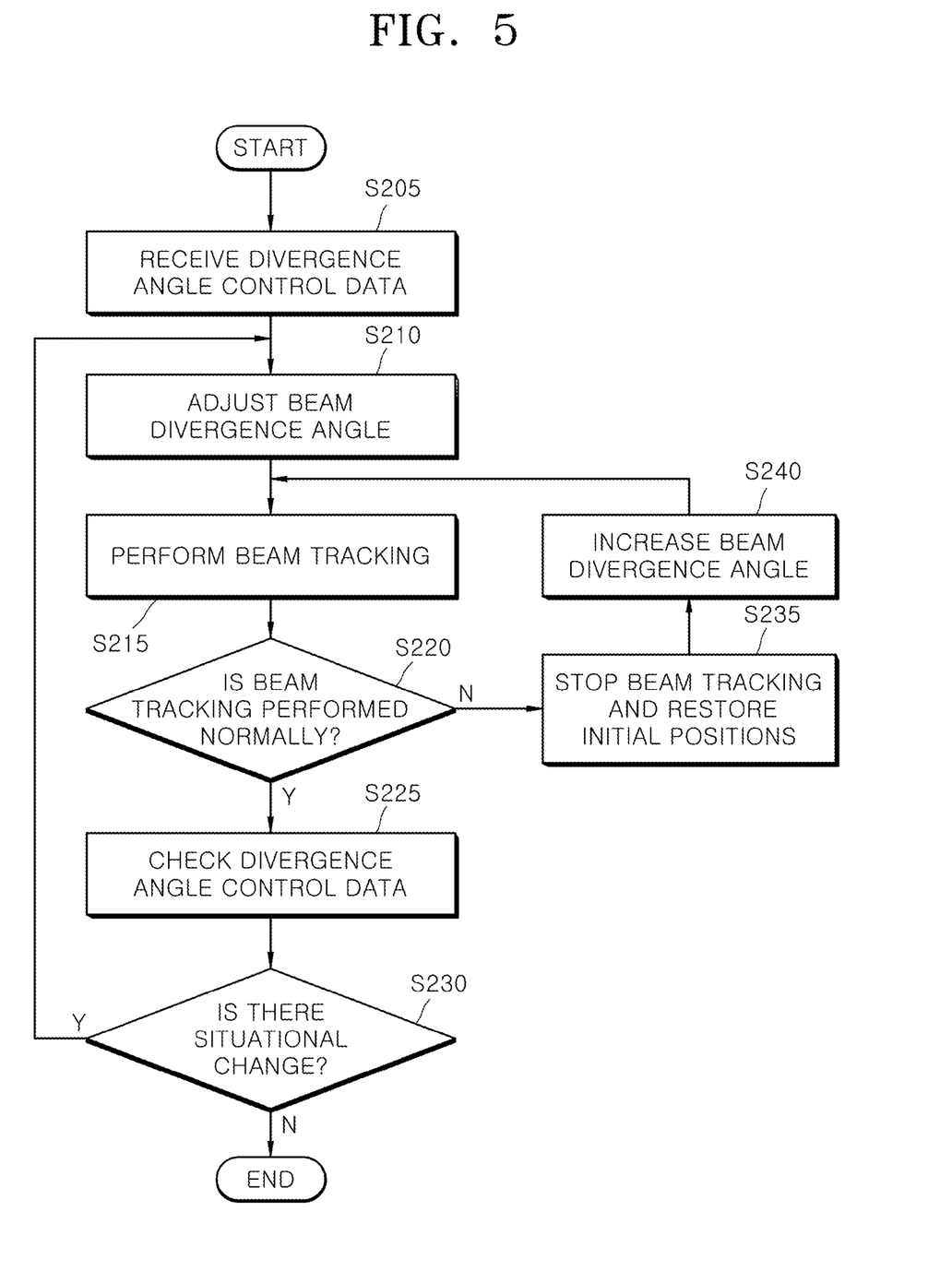
FIG. 5 is a flowchart illustrating a beam tracking method according to yet another exemplary embodiment of the present disclosure.

FIG. 5 is a flowchart illustrating a beam tracking method according to yet another exemplary embodiment of the present disclosure. The present disclosure illustrates that the transmitting device 100 emits a reference beam and the receiving device 200 receives the reference beam and adjusts a divergence angle to be applied to emission of its reference beam.

First, the receiving device 200 receiving the reference beam may receive and check information required for adjusting a beam divergence angle, that is, divergence angle control data, through the receiver-side beam adjustment controller 428 (S205). The divergence angle control data may include at least one of distance information, or light intensity information, or combination thereof. The divergence angle control data may be, for example, auxiliary information which is provided by the auxiliary measurement parts 330 and 430 to generate previously input information, distance information, or light intensity information, light intensity and control information collected by the receiver-side beam path controller 426, etc. Specifically, the auxiliary information collected by the auxiliary measurement parts 330 and 430 may be distance information measured through the laser distance measurement module and GPS location information, received light intensity, etc. shared using the GPS modules and the RF parts 150 and 250.

Subsequently, the receiver-side beam adjustment controller 428 may determine and adjust a reference beam divergence angle on the basis of the divergence angle control data and previously recorded optimal beam divergence angle information (S210).

As an example of the reference beam divergence angle, the previously recorded optimal beam divergence angle information may be used without any change. As another example of the reference beam divergence angle, a divergence angle changed by a specific variable from the optimal divergence angle may be used for stability of beam tracking.

Subsequently, after adjustment of the divergence angle is completed, the receiving device 200 may perform beam tracking in accordance with the adjusted divergence angle (S215).

Subsequently, at least one of the transmitting and receiving devices 100 and 200 may determine whether beam tracking is performed normally (S220).

As an example, whether beam tracking is performed normally may be determined with an output signal of the device 100 or 200 receiving a reference beam or an output signal of the beam path controller 326 or 426 of the receiving device. For example, when the output signal of the beam path controller 326 or 426 vibrates and the amplitude thereof gradually increases, the device may determine that beam tracking is not performed normally.

Specifically, when the output signal of the beam path controller 326 or 426 vibrates and the amplitude gradually increases, an angular error or location error of the reference beam may exceed an allowable error. In this case, the device may determine that beam tracking is not performed normally. The allowable error may be set to a range of angular error or location error at which the receiving device 200 may receive the reference beam and process beam tracking normally. The angular error or location error may be caused by fluctuations of the reference beam output from the beam path control optical part 318 or 418.

When it is determined that beam tracking is not performed normally, the receiving device 200 may stop beam tracking and restore an initial position for an internal module of the device (S235). Subsequently, the receiving device 200 may perform control so that the reference beam divergence angle increases. Specifically, when the angular error or location error based on the divergence angle control data exceeds the allowable error, the beam adjustment controller 328 or 428 of the devices 100 or 200 may correct the divergence angle to increase and determine the corrected divergence angle.

When beam tracking is performed normally, the receiving device 200 may check the divergence angle control data again (S225).

At least one of the transmitting and receiving devices 100 and 200 may determine whether there is a change in the environment between the two devices, that is, a situational change (S230). When there is a situational change, the receiving device 200 may perform operation S210 to adjust the reference beam divergence angle again.

Specifically, when at least one of the two devices receives situational change information after the reference beam having the determined divergence angle is output, the beam adjustment controller 328 or 428 may adjust the reference beam divergence angle on the basis of the divergence angle control data and the situational change information. The situational change information may include at least one of a fluctuation state of the reference beam output from the beam path control optical part 318 or 418, or a change in the divergence angle control data, or a change in output control of the beam path control optical part 318 or 418, or a state change of a free space channel to the device which receives the reference beam, or combination thereof.

When there is no change, the device may determine whether beam tracking is performed. It is shown that the process is finished when it is determined in operation S230 of FIG. 5 that there is no change. However, this is for convenience of illustration, and as described above, it may be determined whether beam tracking is performed.

Exemplary embodiments of the present disclosure mainly describe a system for free-space quantum communication but may also be applied to general free-space optical communication devices and systems in a wider sense in substantially the same way.

Unlike general free-space optical communication, in the free-space quantum communication system 10, a quantum signal cannot be amplified in order to maintain quantum characteristics even with a great loss. Accordingly, to minimize the loss, the free-space quantum communication system 10 requires an advanced beam tracking technology. Exemplary embodiments of the present disclosure correspond to a beam tracking technology for implementing a free-space quantum communication system and may also be applied in the same way to improve beam tracking performance of free-space optical communication devices and systems.

A free-space optical communication device and the like may have substantially the same beam tracking module as a device for free-space quantum communication. The free-space optical communication device may include a signal part that transmits and receives various types of optical signals, and the beam tracking module may output a reference beam for aligning a path of optical signals. The beam tracking module may include a controller, a beam path control optical part, and a beam transmitter that implement substantially the same functions as the configuration illustrated in FIG. 2 or 3. The controller may correspond to the transmitter-side or receiver-side controller 316 or 416, and the beam path control optical part may correspond to the transmitter-side or receiver-side beam path control optical part 318 or 418. The beam transmitter may correspond to the transmitter-side or receiver-side beam transmitter 312 or 412.

According to the present disclosure described above, it is possible to provide a beam tracking module, device, and method for free-space quantum communication with which a beam divergence angle may be adjusted so that beam tracking is implemented universally in various situations, for example, various distance ranges.

According to the present disclosure, a function of adjusting a beam divergence angle is implemented in a beam tracking module used in free-space quantum communication. Accordingly, it is possible to build a general-purpose system for stably performing free-space quantum communication without changing an optical system configuration in a mobile environment in which a communication distance varies not only in a long range but also in a short range and a middle range.

Effects which can be achieved in the present disclosure are not limited to those described above, and other effects which have not been described will be clearly understood by those of ordinary skill in the art from the above description.

Although the exemplary methods of the present disclosure are represented by a series of operations for clarity of description, they are not intended to limit the order in which the operations are performed, and if necessary, operations may be performed simultaneously or in a different order. To implement a method according to the present disclosure, the illustrative operations may exclude some operations and include the remaining operations or additional operations.

Various embodiments of the present disclosure are not intended to be all inclusive and are intended to illustrate representative aspects of the present disclosure. Features described in the various embodiments may be applied independently or in a combination of two or more thereof.

In addition, various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays (FPGAs), general processors, controllers, microcontrollers, microprocessors, etc. may be used for implementation.

The scope of the present disclosure includes software or machine-executable instructions (e.g., an operating system (OS), an application, firmware, a program, etc.) that enable operations according to methods of various embodiments to be performed on a device or computer, and a non-transitory computer-readable medium in which such software or instructions are stored and executable on a device or computer.

What is claimed is:

1. A beam tracking module for free-space quantum communication, comprising:
a controller configured to determine a divergence angle of a reference beam on the basis of divergence angle control data;
a beam path control optical part configured to output the reference beam; and
a beam transmitter configured to adjust the divergence angle through the beam path control optical part so that the reference beam having the determined divergence angle is transmitted.

2. The beam tracking module of claim 1, wherein the divergence angle control data includes at least one of distance information between a transmitter-side free-space quantum communication device and a counterpart free-space quantum communication device each having the beam tracking module, or light intensity information related to a beam received from the counterpart free-space quantum communication device, or combination thereof, and
the distance information includes at least one of estimated distance information inferred from reference beams exchanged between the devices, or measured distance information, or distance information based on location information of the devices, or combination thereof.

3. The beam tracking module of claim 2, wherein the measured distance information is measured through laser distance measuring between the transmitter-side free-space quantum communication device and the counterpart free-space quantum communication device, and
the location information includes location data and altitude data of each of the devices and is acquired by a Global Positioning System (GPS) detector installed in each of the devices and transmitted to be shared between the devices.

4. The beam tracking module of claim 1, wherein, when an angular error or a location error of the reference beam based on the divergence angle control data exceeds an allowable error, the controller corrects the divergence angle to increase and determines the corrected divergence angle.

5. The beam tracking module of claim 4, wherein the allowable error is set in a range of the angular error or the location error in which the counterpart free-space quantum communication device receives the beam and perform a beam tracking process normally, and
the angular error or the location error is caused by fluctuations of the reference beam output from the beam path control optical part.

6. The beam tracking module of claim 1, wherein, when situation change information is received after the reference beam having the determined divergence angle is output, the controller readjusts the divergence angle of the reference beam on the basis of the divergence angle control data and the situation change information, and
the situation change information includes at least one of a fluctuation state of the reference beam output from the beam path control optical part, or a change in the divergence angle control data, or a change in output control of the beam path control optical part, or a state change of a free space channel to the counterpart free-space quantum communication device which receives the reference beam, or combination thereof.

7. The beam tracking module of claim 1, wherein the beam path control optical part includes an optical system assembly having at least one optical component, which includes at least one of lenses, or mirrors, or beam splitters, or image capturing devices or combination thereof, and
to adjust the divergence angle, the beam transmitter controls at least one of movement of the optical system assembly, or a position of the optical component, or a beam path set by the optical component, or combination thereof.

8. The beam tracking module of claim 1, wherein the controller determines the divergence angle by referring to optimal beam divergence angle information for determining a correlation between the divergence angle control data and the divergence angle.

9. The beam tracking module of claim 8, wherein the divergence angle control data includes distance information between a transmitter-side free-space quantum communication device and a counterpart free-space quantum communication device each having the beam tracking module,
the controller outputs the reference beam having a certain divergence angle in accordance with the distance between the devices to the counterpart free-space quantum communication device, performs beam tracking with the counterpart free-space quantum communication device while changing the divergence angle on the basis of a valid optical alignment signal of the reference beam received from the counterpart free-space quantum communication device, and performs control such that a minimum divergence angle is determined to be a final divergence angle among changed divergence angles at which the beam tracking is processed normally, and
the controller performs control such that the optimal beam divergence angle for determining the divergence angle in accordance with the distance is generated by repeatedly determining the final divergence angle while changing the distance.

10. The beam tracking module of claim 9, wherein, when a changed divergence angle at which the beam tracking is processed normally is a set minimum value or less, the controller performs control such that a process related to the determining of the final divergence angle in accordance with a change in the distance stops.

11. A free-space quantum communication device comprising:
a signal part configured to transmit or receive a quantum signal; and
a beam tracking module configured to output a reference beam for aligning a path of the quantum signal,
wherein the beam tracking module comprises:
a controller configured to determine a divergence angle of a reference beam on the basis of divergence angle control data;
a beam path control optical part configured to output the reference beam; and
a beam transmitter configured to adjust the divergence angle through the beam path control optical part so that the reference beam having the determined divergence angle is output.

12. The free-space quantum communication device of claim 11, wherein the divergence angle control data includes at least one of distance information between a transmitter-side free-space quantum communication device and a counterpart free-space quantum communication device each having the beam tracking module, or light intensity information related to a beam received from the counterpart free-space quantum communication device, or combination thereof, and the distance information includes at least one of estimated distance information inferred from reference beams exchanged between the devices, or measured distance information, or distance information based on location information of the devices, or combination thereof.

13. The free-space quantum communication device of claim 12, wherein the measured distance information is measured through laser distance measuring between the transmitter-side free-space quantum communication device and the counterpart free-space quantum communication device, and
the location information includes location data and altitude data of each of the devices and is acquired by a Global Positioning System (GPS) detector installed in each of the devices and transmitted to be shared between the devices.

14. The free-space quantum communication device of claim 11, wherein, when an angular error or a location error of the reference beam based on the divergence angle control data exceeds an allowable error, the controller corrects the divergence angle to increase and determines the corrected divergence angle.

15. The free-space quantum communication device of claim 14, wherein the allowable error is set in a range of the angular error or the location error in which the counterpart free-space quantum communication device receives the beam and perform a beam tracking process normally, and
the angular error or the location error is caused by fluctuations of the reference beam output from the beam path control optical part.

16. The free-space quantum communication device of claim 11, wherein, when situation change information is received after the reference beam having the determined divergence angle is output, the controller readjusts the divergence angle of the reference beam on the basis of the divergence angle control data and the situation change information, and
the situation change information includes at least one of a fluctuation state of the reference beam output from the beam path control optical part, or a change in the divergence angle control data, or a change in output control of the beam path control optical part, or a state change of a free space channel to the counterpart free-space quantum communication device which receives the reference beam, or combination thereof.

17. The free-space quantum communication device of claim 11, wherein the beam path control optical part includes an optical system assembly having at least one optical component, which includes at least one of lenses, or mirrors, or beam splitters, or image capturing devices, or combination thereof, and
to adjust the divergence angle, the beam transmitter controls at least one of movement of the optical system assembly, or a position of the optical component, or a beam path set by the optical component, or combination thereof.

18. The free-space quantum communication device of claim 11, wherein the controller determines the divergence angle by referring to optimal beam divergence angle information for determining a correlation between the divergence angle control data and the divergence angle.

19. The free-space quantum communication device of claim 18, wherein the divergence angle control data includes distance information between a transmitter-side free-space quantum communication device and a counterpart free-space quantum communication device each having the beam tracking module,
the controller outputs the reference beam having a certain divergence angle in accordance with the distance between the devices to the counterpart free-space quantum communication device, performs beam tracking with the counterpart free-space quantum communication device while changing the divergence angle on the basis of a valid optical alignment signal of the reference beam received from the counterpart free-space quantum communication device, and performs control such that a minimum divergence angle is determined to be a final divergence angle among changed divergence angles at which the beam tracking is processed normally, and
the controller performs control such that the optimal beam divergence angle for determining the divergence angle in accordance with the distance is generated by repeatedly determining the final divergence angle while changing the distance.

20. A free-space optical communication device comprising:
a signal part configured to transmit or receive an optical signal; and
a beam tracking module configured to output a reference beam for aligning a path of the optical signal,
wherein the beam tracking module comprises:
a controller configured to determine a divergence angle of a reference beam on the basis of divergence angle control data;
a beam path control optical part configured to output the reference beam; and
a beam transmitter configured to adjust the divergence angle through the beam path control optical part so that the reference beam having the determined divergence angle is output.

* * * * *